(12) United States Patent
Ide

(10) Patent No.: US 11,715,994 B2
(45) Date of Patent: Aug. 1, 2023

(54) CONTROL SYSTEM

(71) Applicant: CANON KABUSHIKI KAISHA, Tokyo (JP)

(72) Inventor: Takeshi Ide, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 362 days.

(21) Appl. No.: 17/074,409

(22) Filed: Oct. 19, 2020

(65) Prior Publication Data

US 2021/0126508 A1 Apr. 29, 2021

(30) Foreign Application Priority Data

Oct. 29, 2019 (JP) .................................. 2019-196440

(51) Int. Cl.
*H02K 7/14* (2006.01)
*H02J 50/80* (2016.01)
(Continued)

(52) U.S. Cl.
CPC ................ *H02K 7/14* (2013.01); *H02J 50/05* (2016.02); *H02J 50/80* (2016.02); *B60K 7/0007* (2013.01); *B60L 2220/44* (2013.01)

(58) Field of Classification Search
CPC .... H02M 3/156; H02M 3/158; H02M 3/1588; H02M 3/155; H02M 3/1582; H02M 3/157; H02M 3/1563; H02M 3/1584; H02M 2003/1566; H02M 2003/1557; H02M 1/32; H02M 1/081–084; H02M 7/42; H02M 7/48; H02M 7/487; H02M 7/501; H02M 7/4826; H02M 7/497; H02M 7/49; H02M 7/4807; H02M 7/537; H02M 7/5387; H02M 7/53; H02M 7/533; H02M 7/53871

See application file for complete search history.

(56) References Cited

U.S. PATENT DOCUMENTS

| 2013/0236192 A1* | 9/2013 | Deicke | H02J 7/00047 |
| | | | 398/135 |
| 2013/0336013 A1* | 12/2013 | Mueller | H02M 3/33573 |
| | | | 363/17 |

(Continued)

FOREIGN PATENT DOCUMENTS

JP 6219495 B2 10/2017

*Primary Examiner* — Bryan R Perez
(74) *Attorney, Agent, or Firm* — Canon U.S.A., Inc. IP Division

(57) ABSTRACT

A control system includes a phase shift unit configured to provide a phase difference between a first switching clock signal and a second switching clock signal, a power transmission coil, a switching circuit configured to switch an input voltage based on the first switching clock signal and apply the switched voltage to the power transmission coil, a power reception coil configured to receive electric power output from the power transmission coil by electromagnetic field coupling, a wireless transmission unit configured to wirelessly transmit the second switching clock signal and output a third switching clock signal, and a rectifier circuit configured to rectify a voltage input from the power reception coil by switching the voltage based on the third switching clock signal and apply the rectified voltage to a load. A voltage input from the power reception coil to the rectifier circuit and the third switching clock signal have different phases.

12 Claims, 4 Drawing Sheets

(51) Int. Cl.
*H02J 50/05* (2016.01)
*B60K 7/00* (2006.01)

(56) References Cited

U.S. PATENT DOCUMENTS

| | | | |
|---|---|---|---|
| 2014/0056034 A1* | 2/2014 | Hyeon | H02M 3/33576 |
| | | | 363/21.02 |
| 2017/0008385 A1 | 1/2017 | Fujimoto et al. | |
| 2017/0271927 A1* | 9/2017 | Sakata | H04B 5/02 |

* cited by examiner

CONTROL SYSTEM

BACKGROUND

Field

The present disclosure relates to a control system.

Description of the Related Art

Systems exist which supply electric power to a motor to drive the motor. For example, a semiconductor exposure apparatus includes a stage for moving a wafer to an exposure position. A motor for minutely moving the wafer to form a pattern on the wafer is mounted on the stage, and a power supply cable for supplying electric power to drive the motor is connected to the stage. The power supply cable is moved along with a movement of the stage, and a tension of the power supply cable can affect accuracy of positioning the stage. It is therefore desirable to wirelessly transmit electric power to drive the motor.

As a technique for wirelessly driving a motor, Japanese Patent No. 6219495 discusses a motor system which wirelessly drives wheels of a vehicle. In addition to wirelessly transmitting electric power to drive the motor, the motor system transmits a control signal to a rectifier circuit on a power reception side (a movable side) by wireless communication using a radio wave, thus realizing a rectification operation, and generating a direct current voltage.

Recently, it has been required in some cases to control with a high degree of accuracy a voltage to be applied to a load unit such as a motor. For example, a semiconductor exposure apparatus is required to apply a minute voltage of several mV to a motor to improve accuracy of positioning a stage. According to the technique discussed in United States Patent Publication Application No. 2017-0008385, a switching noise of a switching circuit on a power transmission side (a fixed side) is also rectified, and a noise voltage of several tens of mV may be generated.

SUMMARY

According to various embodiments of the present disclosure, a control system includes a phase shift unit configured to provide a phase difference between a first switching clock signal and a second switching clock signal, a power transmission coil, a switching circuit configured to switch an input voltage based on the first switching clock signal and to apply the switched voltage to the power transmission coil, a power reception coil configured to receive electric power output from the power transmission coil by electromagnetic field coupling, a wireless transmission unit configured to wirelessly transmit the second switching clock signal and to output a third switching clock signal, and a rectifier circuit configured to rectify a voltage input from the power reception coil by switching the voltage based on the third switching clock signal and to apply the rectified voltage to a load, wherein a voltage input from the power reception coil to the rectifier circuit and the third switching clock signal have different phases.

Further features will become apparent from the following description of exemplary embodiments with reference to the attached drawings.

DESCRIPTION OF THE EMBODIMENTS

Figure 1:
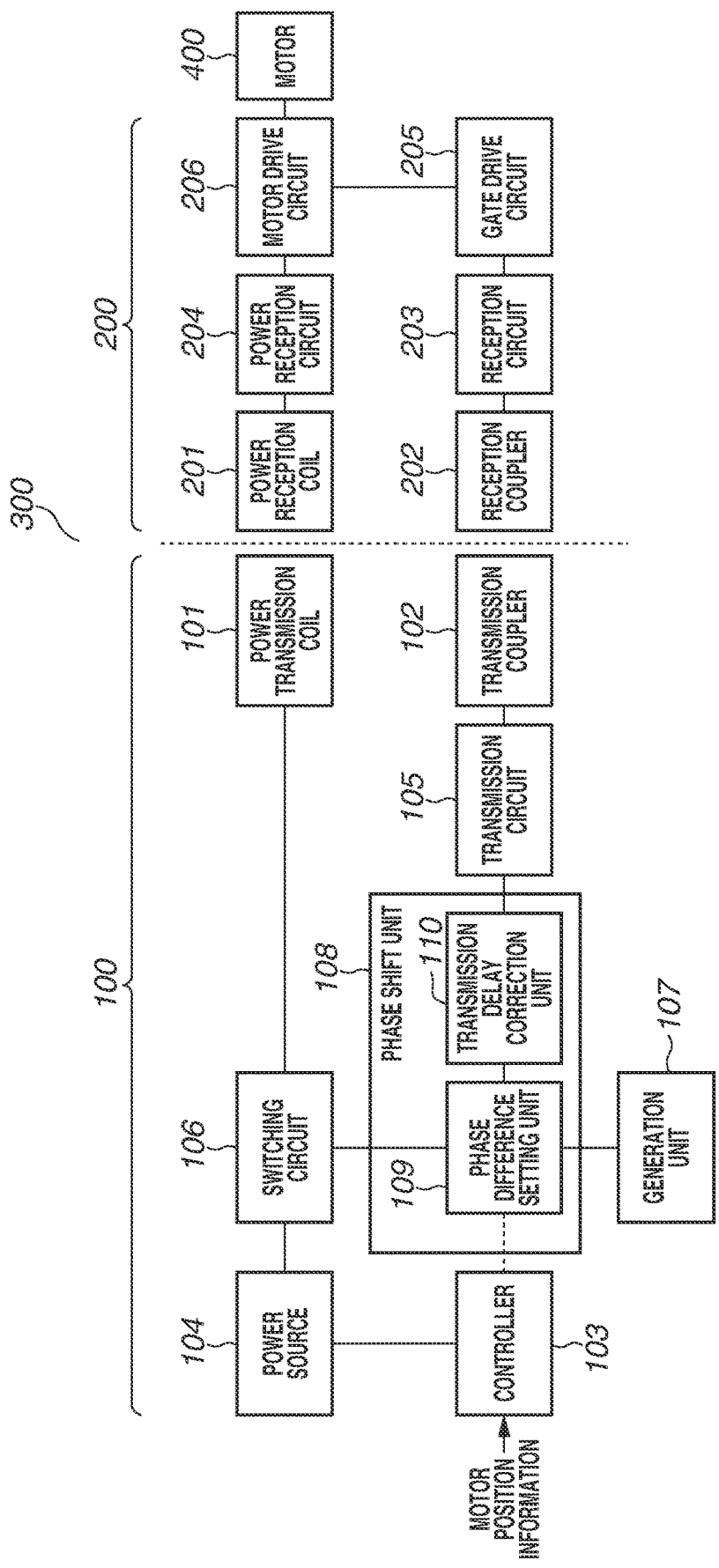
FIG. 1 is a block diagram illustrating a configuration example of a control system according to one embodiment.

Various exemplary embodiments will be described in detail below with reference to the attached drawings. The exemplary embodiments do not restrict the present disclosure, however. A plurality of features is described in the exemplary embodiments, but all of the plurality of features are not essential to every embodiment that is a solution according to the present disclosure. The plurality of features may be combined in other ways in other embodiments. The same reference numerals are used for the same or the similar configurations throughout the drawings to avoid repetition in descriptions.

FIG. 1 is a block diagram illustrating a configuration example of a control system 300 according to a first exemplary embodiment. The control system 300 includes a power transmission unit 100, a power reception unit 200, and a motor 400. The power transmission unit 100 and the power reception unit 200 are not physically connected to each other. Electric power is transmitted from a power transmission coil 101 to a power reception coil 201 in a non-contact manner, and a switching clock signal is transmitted from a transmission coupler 102 to a reception coupler 202 in a non-contact manner.

The power transmission unit 100 includes the power transmission coil 101, the transmission coupler 102, a controller 103, a power source 104, a transmission circuit 105, a switching circuit 106, a generation unit 107, and a phase shift unit 108. The phase shift unit 108 includes a phase difference setting unit 109 and a transmission delay correction unit 110. The power reception unit 200 includes the power reception coil 201, the reception coupler 202, a reception circuit 203, a power reception circuit 204, a gate drive circuit 205, and a motor drive circuit 206.

The controller 103 determines a voltage to be applied to the motor 400 based on motor position information and outputs an instruction on an input voltage value to the power source 104. The power source 104 outputs the voltage according to the instruction on the input voltage value to the switching circuit 106. The switching circuit 106 switches the input voltage output from the power source 104 based on a switching clock signal from the phase shift unit 108 and applies the switched voltage to the power transmission coil 101. The power transmission coil 101 wirelessly transmits the electric power. The power reception coil 201 receives the electric power output from the power transmission coil 101 by electromagnetic field coupling. The power reception circuit 204 is disposed between the power reception coil 201 and the motor drive circuit 206. The power reception circuit 204 is a resonant circuit and outputs the electric power received by the power reception coil 201 to the motor drive circuit 206. The electromagnetic field coupling according to the present exemplary embodiment includes both of electric field coupling and magnetic field coupling. In other words, wireless power transmission may be performed by electric field coupling, by magnetic field coupling, or by both of electric field coupling and magnetic field coupling.

The generation unit 107 generates a switching clock signal for determining a switching timing of a synchronous rectifier circuit included in each of the switching circuit 106 and the motor drive circuit 206. The phase shift unit 108 changes a phase of the switching clock signal generated by the generation unit 107 and outputs the switching clock signal to the switching circuit 106 and the transmission circuit 105. Specifically, the phase shift unit 108 provides a phase difference between the switching clock signal output to the switching circuit 106 and the switching clock signal output to the transmission circuit 105. The transmission circuit 105 transmits the switching clock signal to the reception circuit 203 via the transmission coupler 102 and the reception coupler 202 in a non-contact manner. The reception circuit 203 outputs the received switching clock signal to the gate drive circuit 205. Subsequently, the gate drive circuit 205 converts the switching clock signal into a switching clock signal for driving the synchronous rectifier circuit in the motor drive circuit 206 and outputs the switching clock signal to the motor drive circuit 206. The transmission circuit 105, the transmission coupler 102, the reception coupler 202, the reception circuit 203, and the gate drive circuit 205 are a wireless transmission unit, and the wireless transmission unit wirelessly transmits the switching clock signal input from the phase shift unit 108 and outputs the switching clock signal to the motor drive circuit 206.

The motor drive circuit 206 which includes the synchronous rectifier circuit rectifies a voltage input from the power reception circuit 204 by switching the voltage based on the switching clock signal input to the motor drive circuit 206 and supplies the rectified voltage to the motor 400. The motor 400 is a load and operates according to the electric power.

A motor drive voltage to be input to the motor drive circuit 206 is transmitted from the switching circuit 106 configured to switch the voltage based on the switching clock signal output from the generation unit 107 to the motor drive circuit 206 via the power transmission coil 101, the power reception coil 201, and the power reception circuit 204. The switching clock signal to be input to the motor drive circuit 206 is output from the generation unit 107 and transmitted to the motor drive circuit 206 via the transmission circuit 105, the transmission coupler 102, the reception coupler 202, the reception circuit 203, and the gate drive circuit 205. The phase shift unit 108 adjusts the phase difference between the switching clock signal to be input from the generation unit 107 to the switching circuit 106 and the switching clock signal to be input from the generation unit 107 to the transmission circuit 105 in order to provide a phase difference between the motor drive voltage and the switching clock signal to be input to the motor drive circuit 206. The phase shift unit 108 includes the phase difference setting unit 109 and the transmission delay correction unit 110 which each perform phase shift.

Switching timings of the motor drive voltage and the switching clock signal to be input to the motor drive circuit 206 are each determined based on the switching clock signals output from the same generation unit 107. However, if the phase shift unit 108 does not adjust a phase, a signal transmitting the motor drive voltage and a signal transmitting the switching clock signal take different routes from the generation unit 107 to the motor drive circuit 206, so that transmission delay is different, and phases are different accordingly. The transmission delay correction unit 110 corrects a phase of the switching clock signal to be output to the transmission circuit 105 by an amount of the phase difference caused by the difference in the routes. In other words, in a case where the phase difference setting unit 109 does not adjust the phase, the motor drive voltage and the switching clock signal to be input to the motor drive circuit 206 have the same phase by phase correction by the transmission delay correction unit 110. A phase shift amount by the transmission delay correction unit 110 is a fixed value determined according to a system configuration and may be measured and set in advance.

The phase difference setting unit 109 adjusts phases so that an arbitrary phase difference not caused by transmission delay is generated between the motor drive voltage to be input to the motor drive circuit 206 and the switching clock signal to be input to the motor drive circuit 206. As described above, if a phase shift amount set by the phase difference setting unit 109 is 0°, the phase shift is only a correction amount by the transmission delay correction unit 110, and the phase difference between the motor drive voltage and the switching clock signal to be input to the motor drive circuit 206 is 0°. If the phase difference setting unit 109 provides a predetermined phase difference between the switching clock signal to be input to the switching circuit 106 and the switching clock signal to be input to the transmission delay correction unit 110, the same amount of the phase difference is generated between the motor drive voltage to be input to the motor drive circuit 206 and the switching clock signal to be input to the motor drive circuit 206. Accordingly, in the synchronous rectifier circuit in the motor drive circuit 206, a timing at which the motor drive voltage to be input from the power reception circuit 204 becomes 0 V is deviated from a timing at which a switching element rectified by the switching clock signal from the gate drive circuit 205 is turned on/off. Therefore, a direct current (DC) voltage value output from the synchronous rectifier circuit is lower than that in a case where the phase difference between the motor drive voltage and the switching clock signal is 0°. Accordingly, even if a switching noise generated in the switching circuit 106 is transmitted to the motor drive circuit 206 via the power transmission coil 101, the power reception coil 201, and the power reception circuit 204, the switching noise is not output to the motor 400. For this reason, a minute voltage transmitted from the power source 104 can be applied to the motor 400 without being buried in a noise voltage.

For example, the power transmission unit 100 and the power reception unit 200 are provided on a fixed portion and a movable portion, respectively, of an apparatus on which the control system 300 is mounted. The power transmission coil 101 has a longer length than the power reception coil 201. The power reception coil 201 is uniaxially movable in a direction of the long length.

Figure 2:
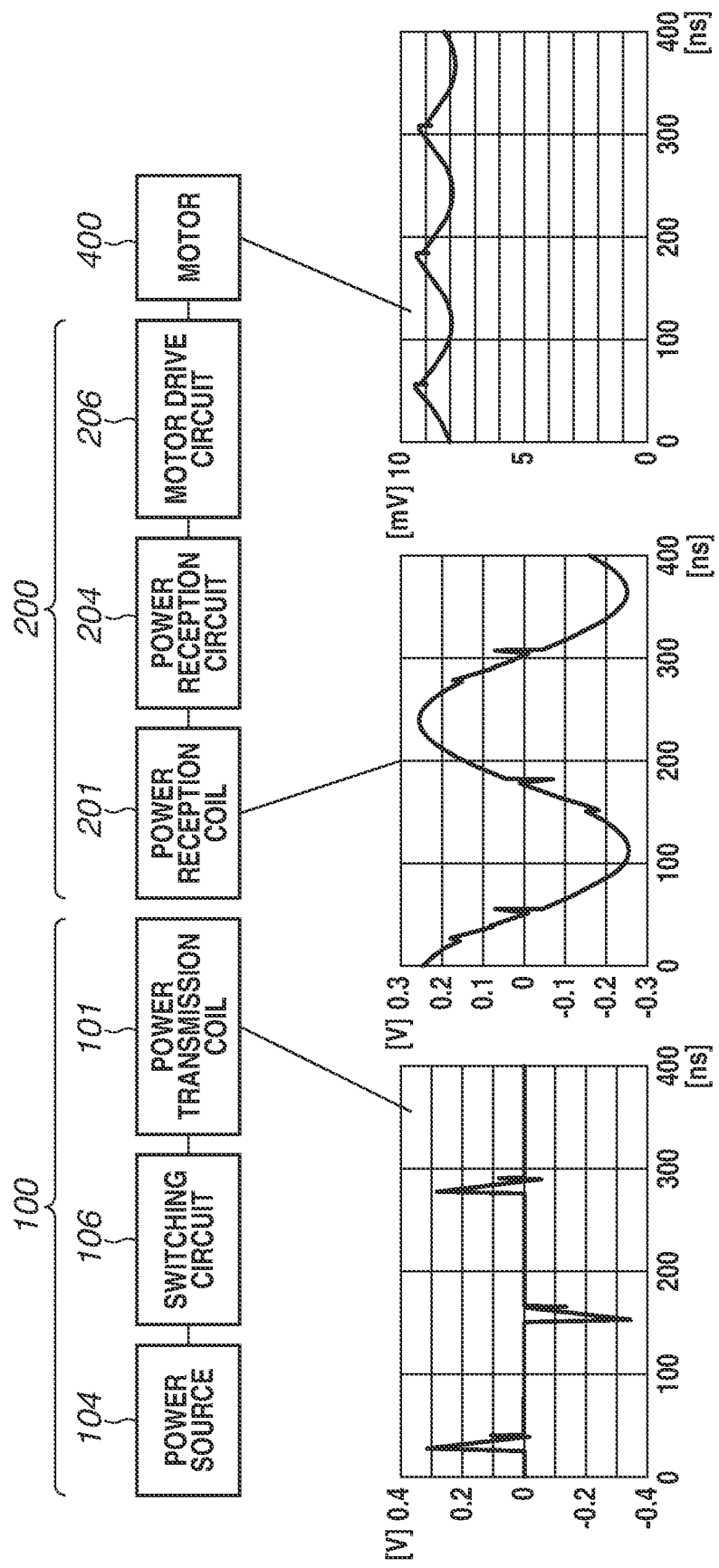
FIG. 2 illustrates a simulation result of a voltage waveform at each position according to one embodiment.

FIG. 2 illustrates how a switching noise generated in the switching circuit 106 is transmitted and applied to the motor 400. Three voltage waveforms express results of circuit simulations. The three voltage waveforms represent a voltage generated in inductance simulating the power transmission coil 101, a voltage generated in the power reception coil 201 including a resonant capacitor, and a voltage generated in the motor 400 after being rectified by the motor drive circuit 206 in order from left to right.

An input voltage to the power source 104 is 0 V. The switching circuit 106 switches the switching element at 4 MHz. Since the power source 104 is 0 V, it is desirable that the voltages generated in the power transmission coil 101, the power reception coil 201, and the motor 400 are 0 V. However, a high frequency component of a 4 MHz rectangular wave input to a gate of the switching element leaks to a drain and is transmitted to the power transmission coil 101.

The power is received by the power reception coil 201 and rectified in the motor drive circuit 206, and as a result, a DC voltage of about 9 mV is output to the motor 400 as a noise voltage. For example, even if a voltage of 5 mV is input from the power source 104 in order to apply only the voltage of 5 mV to the motor 400, the input voltage is buried in the noise voltage of 9 mV, and the voltage of 9 mV is output. In other words, the power source 104 cannot apply a minute voltage of 9 mV or less, and the motor 400 cannot be controlled with high accuracy.

Figure 3:
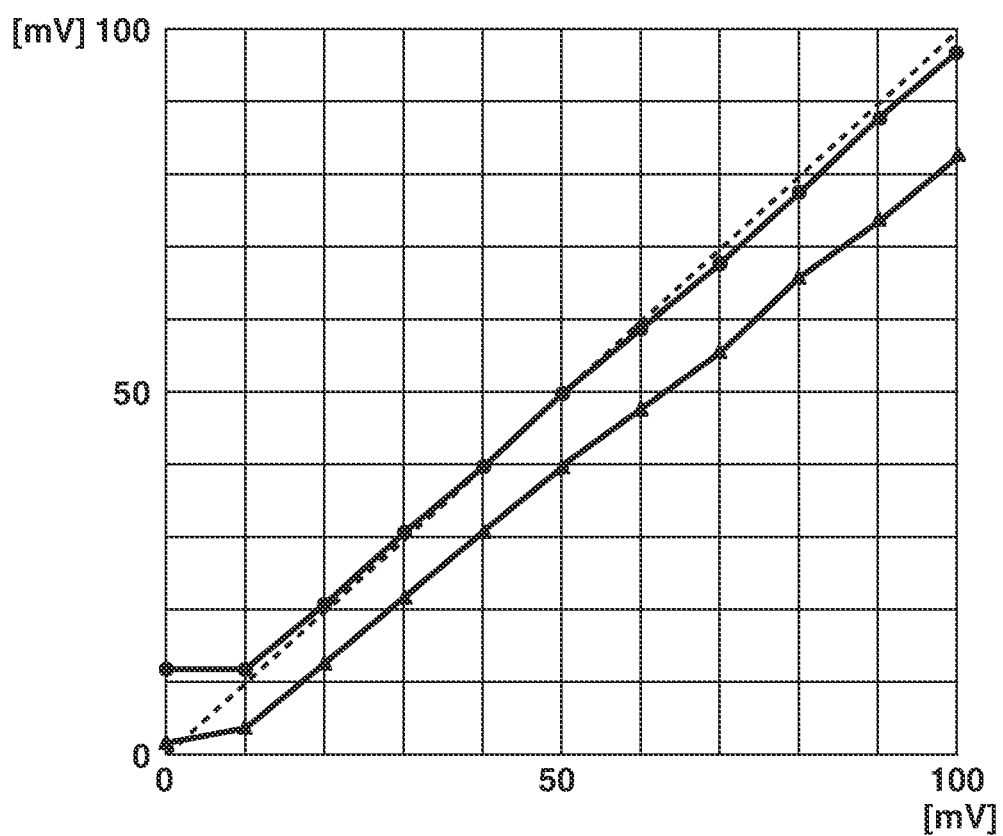
FIG. 3 illustrates measurement results of input/output characteristics of the control system according to one embodiment.

FIG. 3 illustrates measurement results of a relationship between an input voltage from the power source 104 and an output voltage to the motor 400. An abscissa represents the input voltage from the power source 104 to the switching circuit 106. An ordinate represents the output voltage from the motor drive circuit 206 to the motor 400. A dashed line indicates a case in which the input voltage on the abscissa matches with the output voltage on the ordinate. Circle plots indicate a case in which the phase difference between the motor drive voltage and the switching clock signal of the motor drive circuit 206 is 0°. Triangle plots indicate a case in which the phase difference between the motor drive voltage and the switching clock signal of the motor drive circuit 206 is 60 as an example. In the case of the phase difference of 0°, the above-described noise voltage is output, so that the output voltage does not become 10 mV or less when the input voltage is 10 mV or less, and the output voltage is 10 mV whereas the input voltage is from 0 to 10 mV. In this state, the minute voltage of 10 mV or less cannot be applied to the motor 400. In contrast, if the phase difference is 60°, the output voltage is lowered as a whole as compared with the case of the phase difference of 0°, and a minimum output voltage is 2 mV when the input voltage is 0 V. In this state, the minute voltage of 10 mV or less can be applied to the motor 400, and the motor 400 can be controlled with high accuracy. According to the present exemplary embodiment, the phase difference of 60 is described. However, the relationship between the phase difference and the output voltage value changes according to the configuration of each unit in the control system 300, so that an arbitrary phase difference may be selected and set so as to obtain a desired minute voltage.

A control system 300 according to a second exemplary embodiment is to be described. A difference between the second exemplary embodiment and the first exemplary embodiment is to be described. In the control system 300 according to the second exemplary embodiment, the phase shift unit 108 is connected to the controller 103 so that the phase shift unit 108 can receive a signal from the controller 103 in the system configuration illustrated in FIG. 1. The controller 103 outputs an instruction to change a phase difference to the phase difference setting unit 109 in the phase shift unit 108. In FIG. 3, in a case where the phase difference is shifted to 60°, the minute voltage can be output. In a case where a voltage of 10 mV or more is output, it is necessary to increase the input voltage by an amount of decrease in the output voltage compared with a case where the phase difference is 0°. This is because a loss is increased in the synchronous rectifier circuit in the motor drive circuit 206 by a shifted amount of the phase difference, so that the loss will also be increased in a case where a large voltage is output, and the increase of loss may lead deterioration and breakage of the switching element. Therefore, control is added to change the phase difference between 0° and 60° depending on whether the output voltage is the minute voltage or the large voltage. The controller 103 determines a voltage to be applied to the motor 400 based on the motor position information and outputs an instruction on the input voltage value to the power source 104. The controller 103 sets a threshold value to the input voltage value in advance, and in a case where the instruction on the input voltage value lower than the threshold value is output, the controller 103 outputs an instruction signal to set the phase difference to 0° to the phase difference setting unit 109. In a case where the instruction on the input voltage value exceeding the threshold value is output, the controller 103 outputs an instruction signal to set the phase difference to 60° to the phase difference setting unit 109. For example, if the threshold value is set to 10 mV, and the voltage value determined based on the motor position information and to be instructed to the power source 104 is 0 to 10 mV, the controller 103 instructs the phase difference setting unit 109 to set the phase difference to 60°. In a case where the voltage value which the controller 103 instructs the power source 104 is 10 mV or more, the controller 103 instructs the phase difference setting unit 109 to set the phase difference to 0°. In a case where the phase difference of 600 is instructed, the loss is generated compared with the case of the phase difference of 0°, but the loss is generated only when the minute voltage is output, and an absolute value of the loss is small and does not matter. In the above description, the controller 103 outputs the instruction to change the phase difference based on the input voltage value of the power source 104, but the phase shift unit 108 may change the phase difference by detecting the input voltage value of the power source 104 by itself.

As described above, the phase shift unit 108 changes the phase difference between the switching clock signal to the switching circuit 106 and the switching clock signal to the transmission circuit 105 according to the input voltage to the switching circuit 106. For example, the phase shift unit 108 changes the phase difference between the switching clock signal to the switching circuit 106 and the switching clock signal to the transmission circuit 105 according to a result of comparison of the input voltage to the switching circuit 106 with the threshold value.

Specifically, in a case where the input voltage to the switching circuit 106 is the threshold value or more, the phase shift unit 108 provides the above-described phase difference so that the motor drive voltage and the switching clock signal of the motor drive circuit 206 have the same phase. In a case where the input voltage to the switching circuit 106 is less than the threshold value, the phase shift unit 108 provides the above-described phase difference so that the motor drive voltage and the switching clock signal of the motor drive circuit 206 have the different phases.

In the above-described example according to the present exemplary embodiment, in a case where the output voltage of 4 to 12 mV is to be output, the voltage value to be instructed from the controller 103 to the power source 104 may be adjusted. In this case, the relationship between the input and output voltages corresponding to the phase difference in FIG. 3 is stored in the controller 103 in advance, and the controller 103 sets a threshold value of the output voltage instead of the input voltage. For example, the threshold value of the output voltage is set to 12 mV. In a case where the output voltage less than 12 mV is output, the controller 103 instructs the phase difference setting unit 109 to set the phase difference to 60° and instructs the power source 104 to set the voltage value of 0 to 20 mV based on the relationship between the input and output voltages in the case of the phase difference of 60° in FIG. 3, so that the output voltage of 0 to 12 mV can be obtained. In a case where the voltage of 12 mV or more is output, the controller 103 instructs the phase difference setting unit 109 to set the phase difference to 0° and instructs the power source 104 to set the voltage value of 10 mV or more based on the relationship between the input and output voltages in the case of the phase difference of 0° in FIG. 3. Accordingly, the output voltage of 12 mV or more can be obtained with a low loss. According to the present exemplary embodiment, the phase difference of 60 is described. However, the relationship between the phase difference and the output voltage value changes according to the configuration of each unit in the control system 300 as with the case of the first exemplary embodiment, so that an arbitrary phase difference may be selected and set so as to obtain a desired minute voltage.

The phase shift unit 108 changes the phase difference between the switching clock signal to the switching circuit 106 and the switching clock signal to the transmission circuit 105 according to a result of comparison of the output voltage of the motor drive circuit 206 corresponding to the input voltage to the switching circuit 106 with the threshold value.

Specifically, in a case where the output voltage of the motor drive circuit 206 corresponding to the input voltage to the switching circuit 106 is the threshold value or more, the phase shift unit 108 provides the above-described phase difference so that the motor drive voltage and the switching clock signal of the motor drive circuit 206 have the same phase. In a case where the output voltage of the motor drive circuit 206 corresponding to the input voltage to the switching circuit 106 is less than the threshold value, the phase shift unit 108 provides the above-described phase difference so that the motor drive voltage and the switching clock signal of the motor drive circuit 206 have the different phases.

Figure 4:
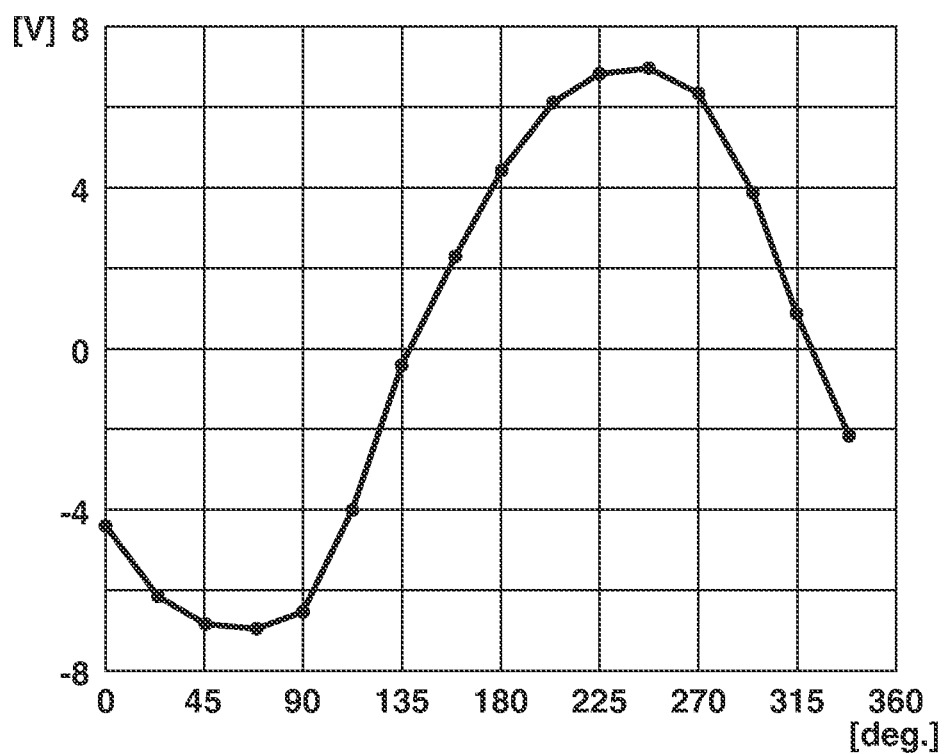
FIG. 4 illustrates a measurement result of an output voltage with respect to a phase difference according to one embodiment.

In the above description, the case is described in which the phase difference is switched between two cases namely 0° and 60°. However, an arbitrary output voltage can be obtained by switching the phase difference in multi-stages without adjusting the voltage value instructed from the controller 103 to the power source 104 as described above. FIG. 4 is a graph in which an output voltage applied to the motor 400 is measured and plotted with respect to the phase difference between the switching clock signal output from the phase shift unit 108 to the switching circuit 106 and the switching clock signal output from the phase shift unit 108 to the transmission circuit 105. An abscissa represents the phase difference. An ordinate represents the output voltage. The input voltage from the power source 104 is constantly 7 V. The phase difference does not include a delay time of each phase of the switching timing to reach the synchronous rectifier circuit in the motor drive circuit 206 and thus does not directly correspond to the phase difference in FIG. 3.

As can be seen from the graph in FIG. 4, the output voltage changes in a sine wave shape with respect to the phase difference. Therefore, in the example in the graph, if the phase difference is arbitrarily set in a specific range of 900 such as the phase differences from 135 to 225°, an arbitrary output voltage can be obtained. In other words, for example, in a case where the output voltage of 12 mV or less is to be output after the output voltage of 12 mV is output in FIG. 3, the controller 103 may store a relationship between the phase difference and the output voltage in FIG. 4 in advance and change the phase difference based on the relationship. The controller 103 gradually changes the phase difference and thus can gradually lower the output voltage while maintaining the input voltage constant. In other words, the control system 300 can output a minute output voltage and control the motor 400 with high accuracy.

The input voltage to the switching circuit 106 is constant. The output voltage of the motor drive circuit 206 changes according to the phase difference provided by the phase shift unit 108.

In a case where it is intended to apply the motor 400 with a voltage of which a positive/negative sign is inverted, for example, in FIG. 4, if the output voltage is positive in a range of the phase difference of 135 to 225°, a negative output voltage can be obtained in a range of 450 to 135°. As described above, the controller 103 can freely control an amplitude and the positive/negative sign of the output voltage by switching the phase difference.

According to the first and the second exemplary embodiments, the transmission coupler 102 and the reception coupler 202 may perform wireless transmission by electromagnetic field coupling or optical coupling. The transmission coupler 102 and the reception coupler 202 may use a radio wave, but a control period will be slowed by a communication error caused by processing delay and a reflection wave and the like.

A power source for driving the reception circuit 203 and the gate drive circuit 205 may be generated using a step up/down circuit from an applied voltage to the motor 400 or may be separately provided by a power transmission coil and a power reception coil.

The power transmission coil 101 and the power reception coil 201 may be formed of wiring on a printed-circuit board. A magnetic sheet may be attached to the printed-circuit board to reduce a loss at the time of electromagnetic field coupling. The power transmission coil 101 and the power reception coil 201 may be a winding transformer including a magnetic material such as ferrite and winding of a litz wire.

The present invention can be changed and modified in various ways without being limited to the above-described exemplary embodiments.

According to the above-described exemplary embodiments, accuracy of voltage application to a load based on electric power to be wirelessly transmitted can be improved.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-196440, filed Oct. 29, 2019, which is hereby incorporated by reference herein in its entirety.

What is claimed is:

1. A control system comprising:
    a phase shift unit configured to provide a phase difference between a first switching clock signal and a second switching clock signal;
    a power transmission coil;
    a switching circuit configured to switch an input voltage based on the first switching clock signal and to apply the switched voltage to the power transmission coil;
    a power reception coil configured to receive electric power output from the power transmission coil by electromagnetic field coupling;
    a wireless transmission unit configured to wirelessly transmit the second switching clock signal and to output a third switching clock signal;
    a rectifier circuit configured to rectify a voltage input from the power reception coil to the rectifier circuit, by switching the voltage based on the third switching clock signal and to apply the rectified voltage to a load; and a setting unit configured to set the phase difference between the first switching clock signal and the second switching clock signal so that a predetermined phase difference not caused by transmission delay is generated between the voltage input from the power reception coil to the rectifier circuit and the third switching clock signal.

2. The control system according to claim 1, wherein the phase shift unit changes the phase difference between the first switching clock signal and the second switching clock signal according to a result of comparison of the input voltage to the switching circuit with a threshold value.

3. The control system according to claim 2,
wherein, in a case where the input voltage to the switching circuit is the threshold value or more, the phase shift unit provides the phase difference between the first switching clock signal and the second switching clock signal so that the voltage input from the power reception coil to the rectifier circuit and the third switching clock signal have a same phase, and
wherein, in a case where the input voltage to the switching circuit is less than the threshold value, the phase shift unit provides the phase difference between the first switching clock signal and the second switching clock signal so that the voltage input from the power reception coil to the rectifier circuit and the third switching clock signal have different phases.

4. The control system according to claim 1, wherein the phase shift unit changes the phase difference between the first switching clock signal and the second switching clock signal according to a result of comparison of an output voltage of the rectifier circuit corresponding to the input voltage to the switching circuit with a threshold value.

5. The control system according to claim 4,
wherein, in a case where the output voltage of the rectifier circuit corresponding to the input voltage to the switching circuit is the threshold value or more, the phase shift unit provides the phase difference between the first switching clock signal and the second switching clock signal so that the voltage input from the power reception coil to the rectifier circuit and the third switching clock signal have a same phase, and
wherein, in a case where the output voltage of the rectifier circuit corresponding to the input voltage to the switching circuit is less than the threshold value, the phase shift unit provides the phase difference between the first switching clock signal and the second switching clock signal so that the voltage input from the power reception coil to the rectifier circuit and the third switching clock signal have different phases.

6. The control system according to claim 1, wherein the phase shift unit comprises:
a correction unit configured to correct the phase difference between the first switching clock signal and the second switching clock signal so that a phase difference corresponding to transmission delay is not generated between the voltage input from the power reception coil to the rectifier circuit and the third switching clock signal.

7. The control system according to claim 1, wherein the phase shift unit changes the phase difference between the first switching clock signal and the second switching clock signal according to the input voltage to the switching circuit.

8. The control system according to claim 1,
wherein the input voltage to the switching circuit is constant, and
wherein an output voltage of the rectifier circuit changes according to the phase difference provided by the phase shift unit.

9. The control system according to claim 1, wherein the wireless transmission unit performs wireless transmission by electromagnetic field coupling.

10. The control system according to claim 1, wherein the wireless transmission unit performs wireless transmission by optical coupling.

11. The control system according to claim 1, further comprising a resonant circuit provided between the power reception coil and the rectifier circuit.

12. The control system according to claim 1, wherein the load is a motor.

* * * * *